United States Patent
Ehrhart et al.

(10) Patent No.: US 7,264,064 B2
(45) Date of Patent: Sep. 4, 2007

(54) HYDRAULIC PUMP DRIVE

(75) Inventors: Phillip J. Ehrhart, Narvon, PA (US); Wayne D. Thaxton, Denver, PA (US)

(73) Assignee: CNH America LLC, New Holland, PA (US)

( * ) Notice: Subject to any disclaimer, the term of this patent is extended or adjusted under 35 U.S.C. 154(b) by 151 days.

(21) Appl. No.: 11/288,562

(22) Filed: Nov. 29, 2005

(65) Prior Publication Data

US 2006/0086512 A1 Apr. 27, 2006

Related U.S. Application Data

(62) Division of application No. 10/870,384, filed on Jun. 17, 2004, now Pat. No. 7,055,618.

(51) Int. Cl.
| | |
|---|---|
| A01B 59/043 | (2006.01) |
| A01B 59/06 | (2006.01) |
| A01B 63/02 | (2006.01) |
| A01B 63/118 | (2006.01) |
| B60D 1/62 | (2006.01) |

(52) U.S. Cl. ............. 172/449; 172/680; 172/776; 56/218; 56/DIG. 14; 280/421

(58) Field of Classification Search ............ 172/449, 172/677, 679, 680, 776; 56/218, 228, DIG. 11, 56/DIG. 14; 280/400, 420, 421
See application file for complete search history.

(56) References Cited

U.S. PATENT DOCUMENTS

| | | | |
|---|---|---|---|
| 3,557,892 A | 1/1971 | Burrough | |
| 4,738,461 A | 4/1988 | Stephenson et al. | |
| 4,776,606 A | 10/1988 | Stephenson et al. | |
| 4,793,430 A | 12/1988 | Stephenson et al. | |
| 4,805,927 A | 2/1989 | Stephenson et al. | |
| 5,099,937 A | 3/1992 | McLean | |
| 5,152,357 A | 10/1992 | McLean et al. | |
| 5,186,271 A | 2/1993 | McLean | |
| 5,193,625 A | 3/1993 | Goll | |
| 5,355,971 A | 10/1994 | Austin et al. | |
| 5,531,283 A | 7/1996 | Austin et al. | |
| 5,706,901 A | 1/1998 | Walters et al. | |
| 5,816,339 A | 10/1998 | Parsons et al. | |
| 6,119,789 A | 9/2000 | Taylor | |
| 6,412,570 B1 | 7/2002 | Pruitt et al. | |
| 6,625,964 B2 | 9/2003 | McLeod et al. | |
| 6,776,432 B2 | 8/2004 | Harkcom et al. | |
| 2002/0047246 A1 | 4/2002 | Harkcom et al. | |

*Primary Examiner*—Christopher J. Novosad
(74) *Attorney, Agent, or Firm*—John William Stader; Michael G. Harms

(57) ABSTRACT

A hydraulic pump drive is mounted to the tongue of an agricultural implement. Connecting components between the pump and the drawbar extender of the towing tractor aim the pump input shaft toward the tractor. A short telescoping PTO assembly connects the pump shaft to the tractor PTO shaft using conventional PTO components operating in a nominal equal angle configuration.

8 Claims, 2 Drawing Sheets

HYDRAULIC PUMP DRIVE

CROSS-REFERENCE TO RELATED PATENT APPLICATIONS

This application is a divisional application of U.S. Patent Application Ser. No. 10/870,384, now U.S. Pat. No. 7,055,618 filed on Jun. 17, 2004, and thereby claims priority to that applications filing date.

BACKGROUND OF THE INVENTION

The present invention relates generally to agricultural machines and, more particularly to an improved hydraulic pump drive for a pull-type agricultural implement.

Most commonly, the various implements used in farming operations are pulled by, and powered by, an agricultural tractor. The implements normally have a pivoting tongue of some sort affixed at one end to the tractor drawbar, and to the implement at the other. A power-take-off shaft (PTO) of the tractor typically provides mechanical power to the implement. The PTO may provide direct drive to the mechanical components of the implement, or may power a hydraulic pump that, in turn, provides hydraulic power to the various components of the implement. In the latter arrangement, the most common the structure has the PTO supporting a pump and gearbox assembly or a direct drive pump and coupler assembly. A PTO-supported pump may encounter several problems, such as, for example, spline fit is critical and difficult to control, unacceptable pump vibration and PTO shaft failures occur if not corrected, and the weight and bulk of a high capacity pump are difficult to handle manually. All of these identified problems either result in high warranty costs or complaints by operators.

It would advantageous to have a hydraulic pump drive that overcomes the problems identified above.

SUMMARY OF THE INVENTION

Accordingly, it is an object of the present invention is to provide an improved hydraulic pump drive for an agricultural implement.

Another object of the present invention is to provide an improved hydraulic pump drive for an agricultural implement that pivotally mounts the hydraulic pump to the implement tongue.

It is another object of the instant invention to provide a hydraulic pump drive for a towed agricultural implement that continually aims the pump drive shaft toward the towing vehicle regardless of the tongue angle.

It is yet another object of the instant invention to provide a hydraulic pump drive for a towed agricultural implement that is durable in construction, inexpensive of manufacture, carefree of maintenance, facile in assemblage, and simple, versatile and effective in use.

These and other objects are attained by providing a hydraulic pump drive mounted to the tongue of an agricultural implement. Connecting components between the pump and the drawbar extender of the towing tractor aim the pump input shaft toward the tractor. A short telescoping PTO assembly connects the pump shaft to the tractor PTO shaft using conventional PTO components operating in a nominal equal angle configuration.

DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail.

When discussing or describing the relative rotational movement between the implement tongue and the tractor, it is common to refer to the freedom of rotation about the vertical axis as "yaw", the horizontal as "pitch" and fore and aft as "roll".

Figure 1:
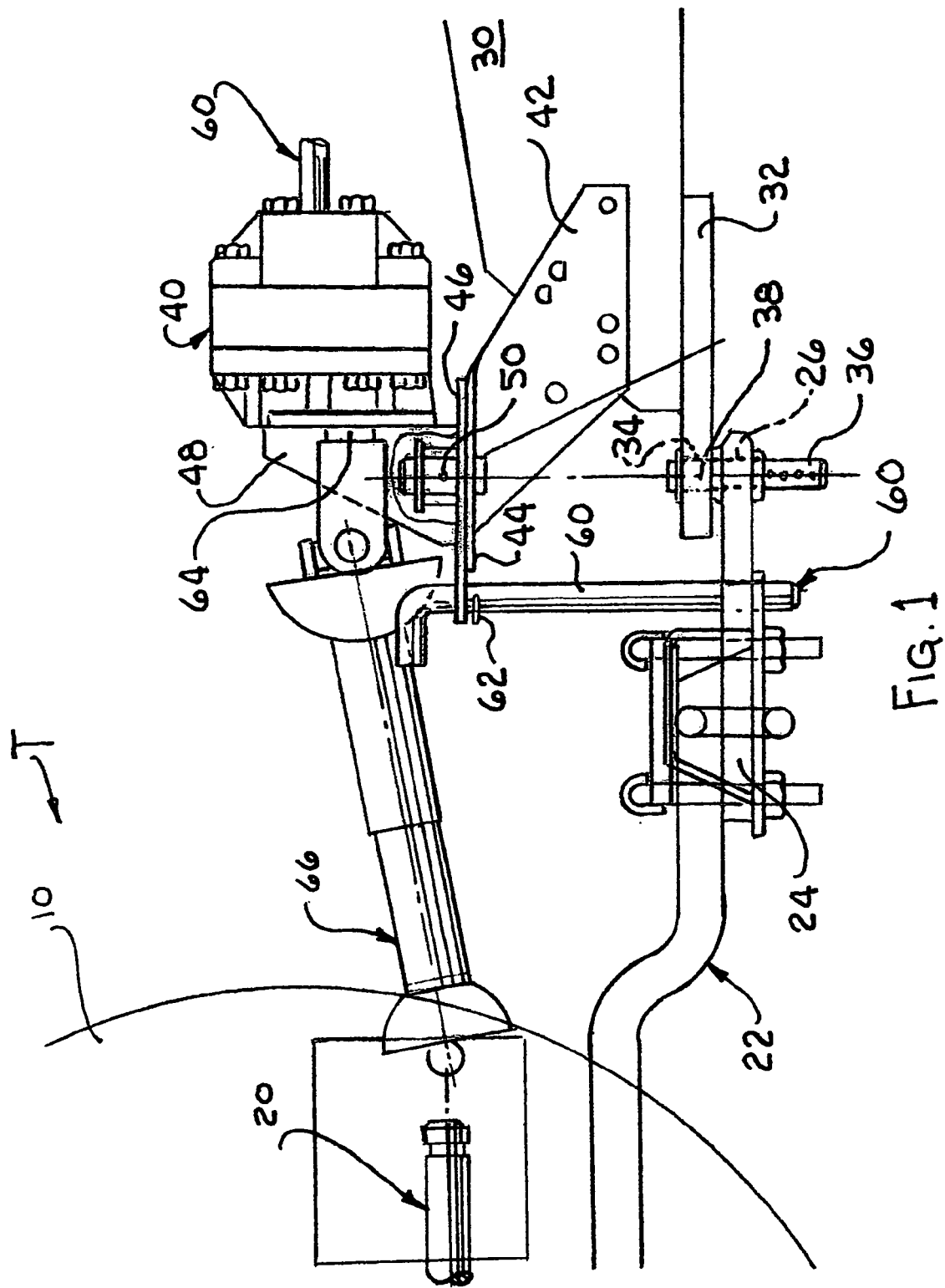
FIG. 1 is a side elevational depiction of the hydraulic pump drive of the instant invention.
Figure 2:
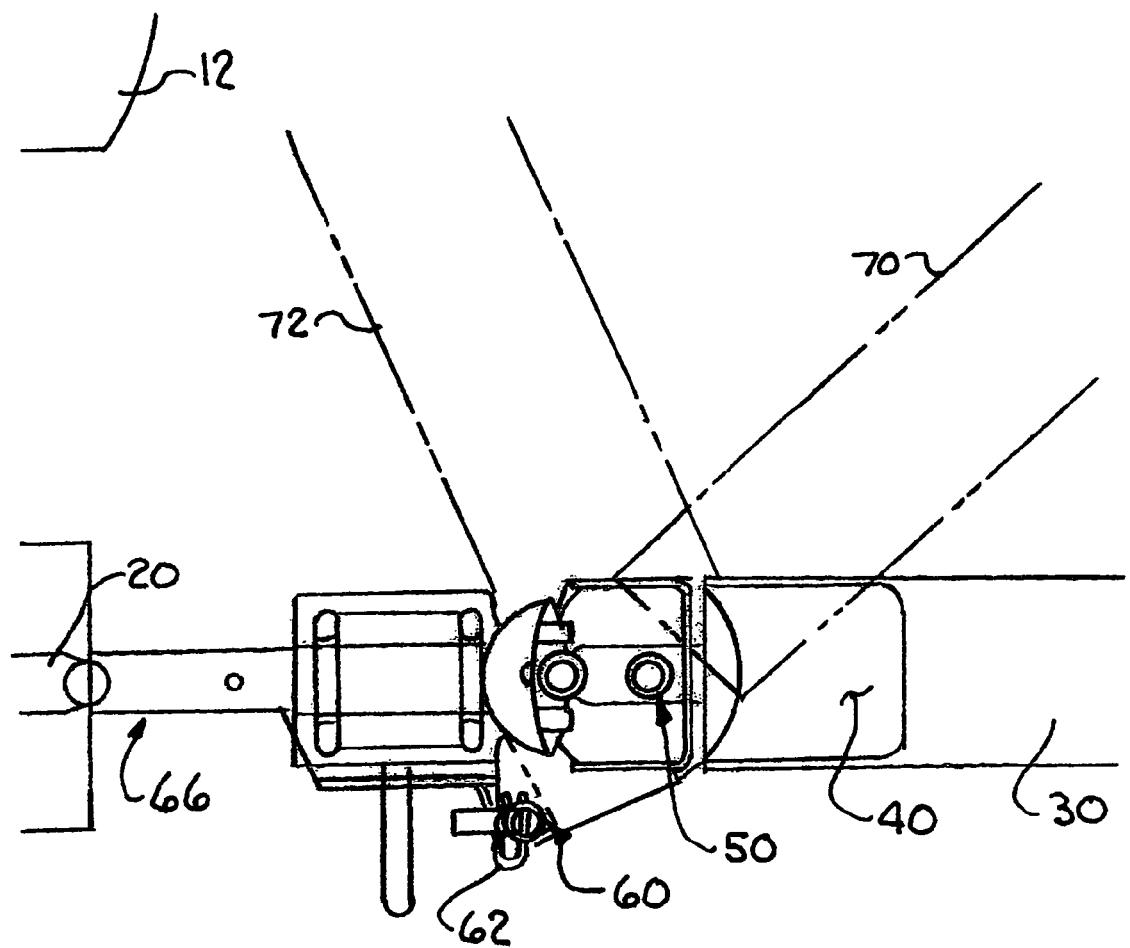
FIG. 2 is a top elevational depiction of the FIG. 1 pump drive.

FIGS. 1 and 2 show an agricultural tractor T, identified further in FIG. 1 by tractor tire 10 and in FIG. 2 by tractor tires 10, 12. Tractor T includes a PTO shaft 20 and a drawbar 22 with a drawbar extender 24 affixed to the end thereof to increase the length of the drawbar and thereby improve the operational characteristics of the drawbar/implement interface. Drawbar extender 24 includes an opening 26 therethrough adjacent the rearward end thereof.

An implement tongue 30 extends rearwardly, relative to the normal direction of travel of tractor T, and supports an implement, not shown, such as a mower-conditioner, baler, or the like. Tongue 30 includes a horizontal tongue pivot plate 32 rigidly affixed thereto and extending forwardly therefrom and including a vertical hole 34 therethrough. An elongate tongue pivot pin 36, having a vertical axis, extends through holes 26 and 34 in drawbar extender 24 and horizontal tongue pivot plate 32.

An hydraulic pump 40 is supported on tongue 30 by a flange-like support assembly comprised of a pair of parallel side support plates (only one of which, 42, is shown in FIG. 1) with a lower support pivot plate 44. Pump 40 includes a flange-like support assembly comprised of a pair of parallel pump support plates (only one of which, 48, is shown in FIG. 1), with an upper support pivot plate 46 affixed to the pump body and maintaining it in a fixed position relative to upper support pivot plate 46. A pump support pivot pin 50, having a vertical axis, extends through holes in the lower and upper pivot plates 44, 46 (in the alternative, pin 50 could be affixed to plate 44, as by welding). The components of the support assembly and the drawbar extender are arranged such that the vertical axes of the tongue pivot pin 36 and the pump support pivot pin 50 are coextensive, i.e., pins 36 and 50 have a common vertical axis 38. Further, support plates 42 and pivot support plate 44 could be formed of a single piece of formed steel.

Forwardly of pivot pins 36 and 50 is an alignment pin 60 extending through the lower and upper pivot plates 44, 46 and drawbar extender 24. Pin 60 is maintained in position by any suitable means, such as a cotter pin or spring clip 62. Pin 60 keeps the pump shaft 64, to be discussed further below, parallel to PTO shaft 20.

The tractor PTO shaft 20 is connected to the pump shaft 64 by a telescoping equal angle PTO assembly 66. As shaft 20 is rotated, the hydraulic pump 40 pumps oil through hoses 68 to and from the operational components of the implement.

The benefits of the instant invention are attained by pivotally mounting the hydraulic pump 40 to the implement tongue 30. Connecting components between the pump 40 and the drawbar extender 24 aim the pump input shaft 64 toward tractor T at all times. In fact, some later model tractors have provisions to extend the drawbar to a length that generally equals the standard drawbar length plus an extender, thus eliminating the need for the extender for turning or PTO provisions—the alignment pin 60 could be pivotally affixed to an attachment on the drawbar as well as the extender. FIG. 2 shows, in phantom, the tongue in a normal implement operating position 70 and in the maximum turn angle position 72. A short telescoping PTO assembly 66 connects pump shaft 64 to the tractor PTO shaft 20 using conventional PTO components, and operates in a nominal equal angle configuration. The telescoping is needed to accommodate elevation differences between the pump and tractor shafts, and to allow for tractor pitching. Since the pump 40 is aimed toward the tractor regardless of the tongue angle relative to the drawbar, no additional telescoping or joint angle allowances are needed for turning. The drive action is similar to that shown in patent publication no. 2002/0047246, dated Apr. 25, 2002. Flexible hoses 68 are used to connect pump ports to hydraulic lines that are secured to the tongue 30.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

What is claimed is:

1. In combination with a hydraulically-driven agricultural implement having a tongue adapted to be pivotably attached to the drawbar of a tractor, and an agricultural tractor having a PTO shaft with a longitudinal horizontal axis extending along a line generally parallel to the direction of travel of the tractor, a hydraulic pump drive comprising:

an hydraulic pump with an input shaft, said pump affixed to an upper pivot plate that is, in turn, rotatably affixed to the tongue at a first location by a support pivot pin having a generally vertical axis;

a horizontal tongue pivot plate rigidly affixed to the tongue and extending forwardly therefrom, said tongue pivot plate rotatably affixed at a second location to the drawbar by a tongue pivot pin having a generally vertical axis, the generally vertical axes of said support pivot pin and said tongue pivot pin being vertically axially aligned;

a mechanism interconnecting said drawbar and said upper pivot plate such that said input shaft is directed toward the tractor regardless of the angle of the tongue relative to the direction of travel of the tractor; and a PTO assembly interconnecting said pump input shaft and the PTO shaft.

2. The combination of claim 1, wherein:

said mechanism includes an alignment pin having a vertical axis; and said pivot pin affixes said upper pivot plate to said drawbar at a third location.

3. The combination of claim 2, wherein:

said drawbar includes a drawbar extender; and said second and third locations are on said drawbar extender.

4. The combination of claim 3, further including:

a lower pivot plate rigidly affixed to said tongue; and said upper pivot plate is rotatably affixed to said lower pivot plate at said first location by said support pivot pin.

5. The combination of claim 4, wherein:

the vertical axis of said alignment pin is forward of the vertical axes of said support pivot pin and said tongue pivot pin.

6. In combination with a hydraulically-driven agricultural implement having a tongue adapted to be pivotably attached to the drawbar extender of a tractor, and an agricultural tractor having a PTO shaft with a longitudinal horizontal axis extending along a line generally parallel to the direction of travel of the tractor, a hydraulic pump drive comprising:

an hydraulic pump with an input shaft, said pump affixed to an upper pivot plate that is, in turn, rotatably affixed to the tongue at a first location by a support pivot pin having a generally vertical axis;

a horizontal tongue pivot plate rigidly affixed to the tongue and extending forwardly therefrom, said tongue pivot plate rotatably affixed at a second location to the drawbar extender by a tongue pivot pin having a generally vertical axis, the generally vertical axes of said support pivot pin and said tongue pivot pin being vertically axially aligned;

a mechanism interconnecting said drawbar extender and said upper pivot plate such that said input shaft is directed toward the tractor regardless of the angle of the tongue relative to the direction of travel of the tractor; and a PTO assembly interconnecting said pump input shaft and the PTO shaft.

7. The combination of claim 6, further including:

a lower pivot plate rigidly affixed to said tongue; and said upper pivot plate is rotatably affixed to said lower pivot plate at said first location by said support pivot pin.

8. The combination of claim 7, wherein:

the vertical axis of said alignment pin is forward of the vertical axes of said support pivot pin and said tongue pivot pin.

* * * * *